United States Patent
Rothermel et al.

(10) Patent No.: US 9,979,566 B2
(45) Date of Patent: May 22, 2018

(54) HYBRID FORWARD ERROR CORRECTION AND REPLAY TECHNIQUE FOR LOW LATENCY

(71) Applicant: Intel Corporation, Santa Clara, CA (US)

(72) Inventors: Brent R. Rothermel, Pottstown, PA (US); Todd M. Rimmer, Exton, PA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/277,577

(22) Filed: Sep. 27, 2016

(65) Prior Publication Data

US 2018/0091332 A1 Mar. 29, 2018

(51) Int. Cl.
*G06F 11/08* (2006.01)
*G06F 11/14* (2006.01)
*H04L 25/03* (2006.01)
*H04L 27/20* (2006.01)

(52) U.S. Cl.
CPC ........ *H04L 25/03006* (2013.01); *G06F 11/08* (2013.01); *G06F 11/14* (2013.01); *H04L 27/2032* (2013.01)

(58) Field of Classification Search
CPC .......... H04L 25/03006; H04L 27/2032; H03M 13/61; H03M 13/43; H03M 13/25; G06F 11/08; G06F 11/14
See application file for complete search history.

(56) References Cited

U.S. PATENT DOCUMENTS

| | | | |
|---|---|---|---|
| 6,092,142 A | 7/2000 | Mehta et al. | |
| 7,593,380 B1 | 9/2009 | Ferguson et al. | |
| 7,904,779 B2 | 3/2011 | Belogolovy et al. | |
| 8,132,087 B2 | 3/2012 | Linkewitsch | |
| 2004/0062302 A1* | 4/2004 | Fujii | H04L 1/06 375/232 |
| 2006/0048200 A1* | 3/2006 | Jaworski | H04L 43/50 725/107 |
| 2008/0022181 A1* | 1/2008 | Belogolovy | H04L 1/0057 714/751 |
| 2008/0209298 A1* | 8/2008 | Chae | H04L 1/0071 714/748 |
| 2009/0031183 A1* | 1/2009 | Hoshino | H04L 1/0001 714/748 |

(Continued)

*Primary Examiner* — Jean B Corrielus
(74) *Attorney, Agent, or Firm* — Patent Capital Group (57) ABSTRACT

Disclosed herein are high performance systems with low latency error correction as well as related devices and methods. In some embodiments, high performance systems may include: central processing units, adapter chips, and switch chips connected via channels, each chip including link level forward error correction and link level replay, where errors at or below a threshold level are corrected by forward error correction and remaining errors are corrected using replay. In some embodiments, high performance systems may include: central processing units, adapter chips, and switch chips connected via channels, each chip including link level forward error correction, link level replay, and a multiplexer for determining which error correction technique to use based on the number of errors and an error threshold level.

13 Claims, 7 Drawing Sheets

(56) References Cited

U.S. PATENT DOCUMENTS

| | | | |
|---|---|---|---|
| 2009/0049362 A1* | 2/2009 | Mudulodu, Sr. | H03M 13/6306 714/755 |
| 2009/0055701 A1* | 2/2009 | Hoshino | H04L 1/0009 714/748 |
| 2009/0100310 A1* | 4/2009 | Yoo | H04L 1/1845 714/748 |
| 2009/0158122 A1* | 6/2009 | Gagnon | G06F 11/10 714/763 |
| 2010/0074350 A1* | 3/2010 | Malladi | H04L 1/0041 375/260 |
| 2010/0146355 A1* | 6/2010 | Jiang | H04L 1/1671 714/749 |
| 2013/0322287 A1* | 12/2013 | Bontu | H04L 1/0015 370/252 |
| 2014/0226647 A1* | 8/2014 | Das | H04W 56/0035 370/350 |

* cited by examiner

HYBRID FORWARD ERROR CORRECTION AND REPLAY TECHNIQUE FOR LOW LATENCY

BACKGROUND

High performance computers are required to transmit vast amounts of data, which requires high throughput and low error rates at low latency. High-speed signaling at 25 Gbps (gigabits per second) and higher per lane may result in a significant increase in bit error ratio due to interconnect imperfections and length-dependent signal loss. Previous approaches have improved the error ratio by using error correcting codes or packet replay. However, as speeds increase, these conventional techniques increase the latency data transmission through the system. There exists a need for error correction techniques to enable data transmission over long length channels, which operate at a higher bit error ratio, while maintaining low latency.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Disclosed herein are high performance systems with low latency error correction as well as related devices and methods. In some embodiments, high performance systems may include: central processing units, adapter chips, and switch chips connected via channels, each chip including link level forward error correction and link level replay, where errors at or below a threshold level are corrected by forward error correction and remaining errors are corrected using replay. In some embodiments, high performance systems may include: central processing units, adapter chips, and switch chips connected via channels, each chip including link level forward error correction, link level replay, and a multiplexer for determining which error correction technique to use based on the number of errors and an error threshold level.

Unlike previous approaches, error correction systems and methods disclosed herein use a combination of forward error correction and replay at the link level to correct errors while maintaining low latency in high performance computing systems. Forward error correction may be used to correct a number of errors below a threshold value, which reduces the bit error ratio, then replay may be used to correct any remaining errors. Forward error correction introduces a high latency penalty when a large number of errors need to be corrected, with the latency scaling quadradically with the number of errors being corrected. Link level replay introduces higher latency if the bit error ratio on the link is too high or the delay (length) of the link is too high. By combining forward error correction and replay methods, the latency typically introduced by each correction method individually may be reduced such that efficient data transmission on long channels with high bit error ratio levels may be achieved.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The terms "a" or "an" as used herein, as is common in patent documents, include one or more than one, independent of any other instances or usages of "at least one" or "one or more."

High-performance computing (HPC) is the use of aggregated computing power for handling data intensive and computing intensive tasks, such as simulation, modeling, or rendering. HPC requires a vast amount of memory and processing capabilities, which may be achieved by coupling or networking multiple processing units or nodes together to create a supercomputer, which also significantly increases the amount of data transfer required in the system. When running distributed simulations over several nodes, the computational units must use the network to communicate. A network channel (or wire) conveys an information signal, for example, a digital bit stream, from one or several senders (or transmitters) to one or several receivers. Data rate refers to the average rate that data is transmitted and typically is expressed in units of bits per second, or the like. As data rate increases, the bit error ratio increases as well.

Most HPC clusters are equipped with high-bandwidth/low-latency networks, such that data is quickly transferred between the different nodes. Bandwidth refers to the bit-rate of available or consumed information capacity expressed in metric multiples of bits per second. Bandwidth may be determined by transmitter speed (i.e., the speeds the transmitter can put bits on a wire) and the capacity of a wire (i.e., material capability), among other factors. Latency refers to the amount of time it takes for a packet of data to travel from one designated point to another.

In some embodiments, processing units or nodes may be connected together with switches, such that every node may communicate and transmit data to every other node. In a typical supercomputer, thousands of processing units are connected together via switches and mounted on chasses. Multiple chasses or racks are connected via wires or cables, and may fill a warehouse-sized building. Wires may be as long as two to three meters within a rack and as long as 100 meters for rack to rack connections. Propagation delay may be defined by the length of wire. A longer wire requires a longer time to transmit data. For example, a node may be an integrated circuit (IC), commonly, a central processing unit (CPU), which is a set of electronic circuits on one small plate of semiconductor material. ICs are commonly referred to as chips or microchips. In some embodiments, a node may be, for example, a memory controller, a storage controller, GPU, or accelerator, that is connected to another node via a network. In some embodiments, nodes are connected via a network without switch chips, for example, in a point to point network, such as a memory bus.

Figure 1A:
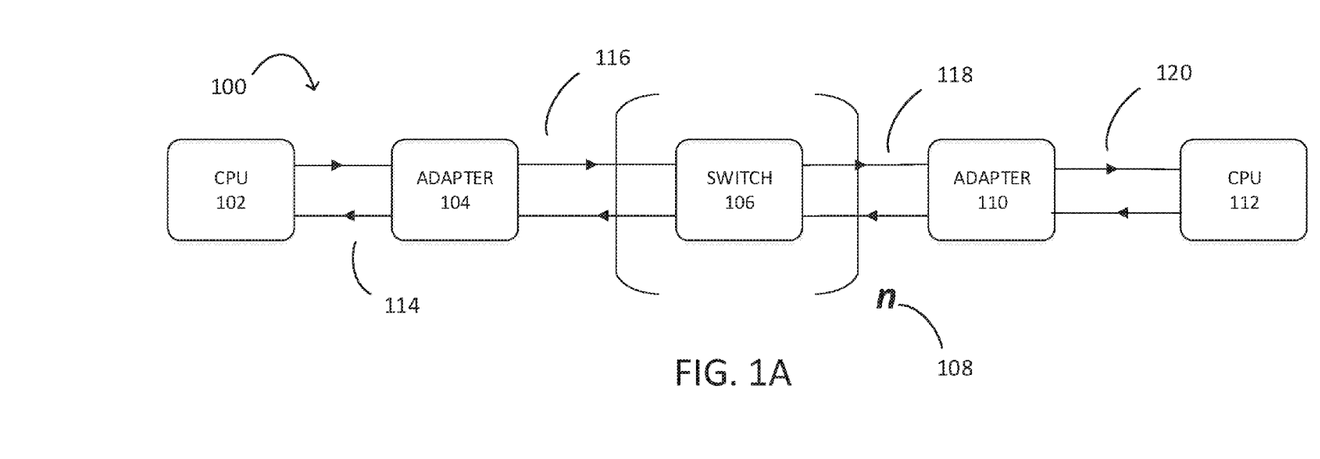
FIG. 1A is a simplified block diagram of an exemplary high performance computing system connecting two central processing units, in accordance with various embodiments.

FIG. 1A is a simplified block diagram of an exemplary HPC system connecting two central processing units. System 100 may include at least two central processing units (CPUs) 102, 112, adapters chips 104, 110, and a switch chip 106. Each CPU 102, 112 may be connected 114, 120 to an adapter chip 104, 110, respectively. Each adapter chip 104, 110 may be connected 116, 118 to a switch chip 106. A CPU 102, 112 performs the processing function and may include a processor, memory, and a transmitter, among other components. An adapter chip 104, 110 moves data between the CPU's memory and the fabric based on commands issued by the CPU instructing the adapter to send packets and/or buffer data packets post receipt. In simplest terms, the adapter converts CPU instructions into a fabrics protocol for transmitting data over the network. A switch chip 106 channels incoming data flow from multiple input ports to the appropriate output port for its destination. System 100 may include thousands of CPUs 102, 112 and adapter chips 104, 110 interconnected via hundreds of switches 106 as indicated by the parenthesis around switch 106 and the letter n 108. In some embodiments, the connections 114, 116, 118, 120 may include wires, such as copper wire or fiber optic wires, among others. The connection that links one chip and a next chip (or neighbor chip) (for example, connections 114, 116, 118, 120) is referred to as the data link layer or, simply, the link layer. Data is transmitted from chip to chip via the link layer. A data link may include encoding, decoding, and correcting errors in transmitted data.

Figure 1B:
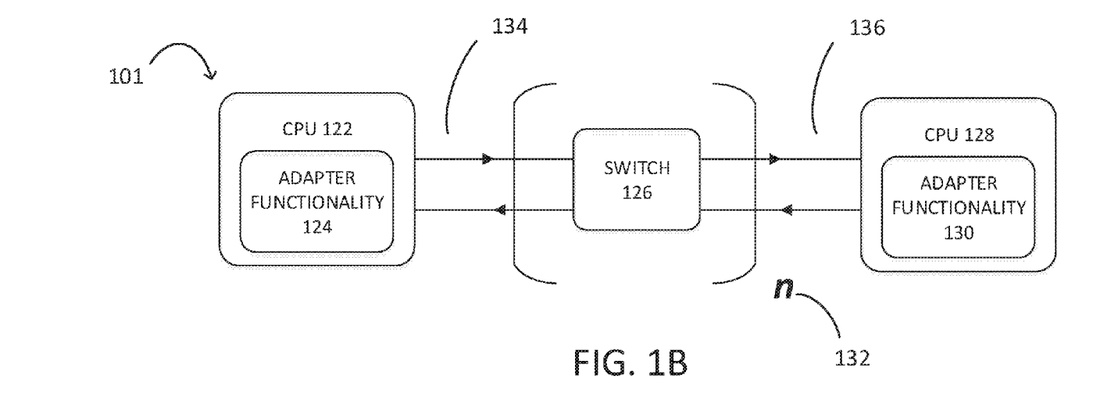
FIG. 1B is a simplified block diagram of another exemplary high performance computing system connecting two central processing units, in accordance with various embodiments.

FIG. 1B is a simplified block diagram of an exemplary HPC system connecting at least two CPUs. System 101 may include at least two CPUs 122, 128 having an integrated adapter functionality 124, 130, and connected to switch 126 via connections 134, 136. In some embodiments, the integrated adapter functionality 124, 130 may be a separate adapter chip on the CPU 122, 128. In some embodiments, the adapter functionality 124,130 may be components on the CPU 122, 128 capable of performing adapter functionality. Connections 134, 136 may be any suitable connections, for example, copper wires. Switch 126 may include a plurality of interconnected switches as indicated by the parenthesis around switch 126 and the letter n 132. In some embodiments, a combination of CPUs from system 100 and system 101 may be used.

A connection or wire over which large amounts of data are transmitted may add errors to the data being transmitted over the wire, such as with high performance computer systems. Data is typically transferred in bit packets, commonly referred to as packets. Common errors include inverted bits or dropped bits. Errors may occur based on the distance data travels, where more errors occur over a greater distance, and/or on the physical material, for example, fiber optic and copper wire may have different error rates. Bit error ratio (BER) is the error ratio and is calculated by taking the number of erroneous bits divided by the number of bits transmitted. A typical BER is $10^{-10}$, where one erroneous bit occurs in every 10 billion bits transmitted. BER may worsen with cheaper materials and longer wires. Reduced error ratios may be built into a system when designed, however, error-free or low BER systems may be costly. Various techniques may be used to address errors and noise in data transmission.

Forward error correction (FEC), or error-correcting code (ECC), is a process of a sender adding redundant data to a packet, such that the data may be recovered (up to the capability of the code being used) by a receiver even when errors were introduced during transmission. The redundancy allows the receiver to detect a limited number of errors that may occur in the packet and to correct these errors. The redundant data or parity data is additional data bits added to the data packet, such that the packet includes payload bits (original data bits) and FEC bits. Example FEC codes for processing data include Hamming codes and Reed-Solomon codes. FEC enables error correction without retransmission of the data at the cost of a reduced bandwidth as the same redundant data is transmitted even if there are zero errors to correct. FEC also adds latency. The latency of the FEC decode and correction scales quadradically with the number of errors corrected. However, in order to maintain a consistent flow of data, the receiver must plan for the worst-case correction scenario and buffer the data when there are fewer errors.

Error correction using retransmissions of data may be referred to as replay, as the sequence of packets starting from the erroneous packet are retransmitted from the sender to the receiver. In some embodiments, redundant bits are added to the data packet by the sender using an error-detecting (ED) code, such as a cyclic redundancy check (CRC). The receiver compares the received error code to the error code expected, by recalculating the error code using the received payload. If the received and calculated error codes differ, the received packet is erroneous. Receivers detecting a corrupted message may request that the sender resend the packet. Retransmissions of data delays receipt of a data packet as well as every other data packet that is "on the wire" in transit (i.e., was sent after the corrupted data packet). As data packet sequence must be maintained, all subsequent packets on the wire must be rejected and retransmitted in sequence. If the wire is long, a significant number of packets may require retransmission, thereby increasing the effective latency and reducing the effective bandwidth of the link.

Using FEC may reduce the bandwidth of the system and may increase the latency of all packets, as a function of the number errors that may be corrected in a given packet. Using replay also may reduce the bandwidth and may increase the latency of packets needing correction within the system. Using a combination of FEC and replay in a system may transmit error-free data while minimizing latency and maintaining high bandwidth. FEC may be used to correct packets with a quantity of errors at or below a threshold, which keeps the FEC error correction latency low. If the number of errors in a given packet exceeds the capability of the FEC code, replay may be used to retransmit the data. By optimizing the number of errors corrected by FEC, the amount of replay requests may be reduced such that the system may maintain low latency and high bandwidth.

Error threshold level is the number of errors the FEC code can correct. Error threshold depends on the complexity of the system and the tolerable latency added by the FEC block. As such, the error threshold may be defined based on system requirements and may vary from system to system. Some factors that may determine the error threshold include data rate, propagation delay (i.e., length of channel), BER, latency tolerance, and bandwidth tolerance, among others. For example, a system with a higher latency tolerance may define the error threshold at 4 while a system with a lower BER and higher bandwidth tolerance may define the error threshold at 1. In another example, a system designed to minimize latency and to maximize bandwidth at a higher BER may have an error threshold of 2. The average error correction latency overhead is equal to the FEC latency added to the BER after the FEC correction times by the replay latency. As described herein, FEC latency occurs for every packet while replay latency occurs only for packets where FEC does not correct all the errors. By decreasing BER_after_FEC, the FEC latency increases quadradically. In order to optimize the average latency of a system, the following may be considered: the FEC code chosen, the hardware latency, and the replay latency, which is a function of hardware design and wire length, etc. The actual values will vary with the specific system design. For a given design on a given length cable, replay latency is fixed. In some embodiments, the replay latency value may be 200 ns to 400 ns.

Figure 2:
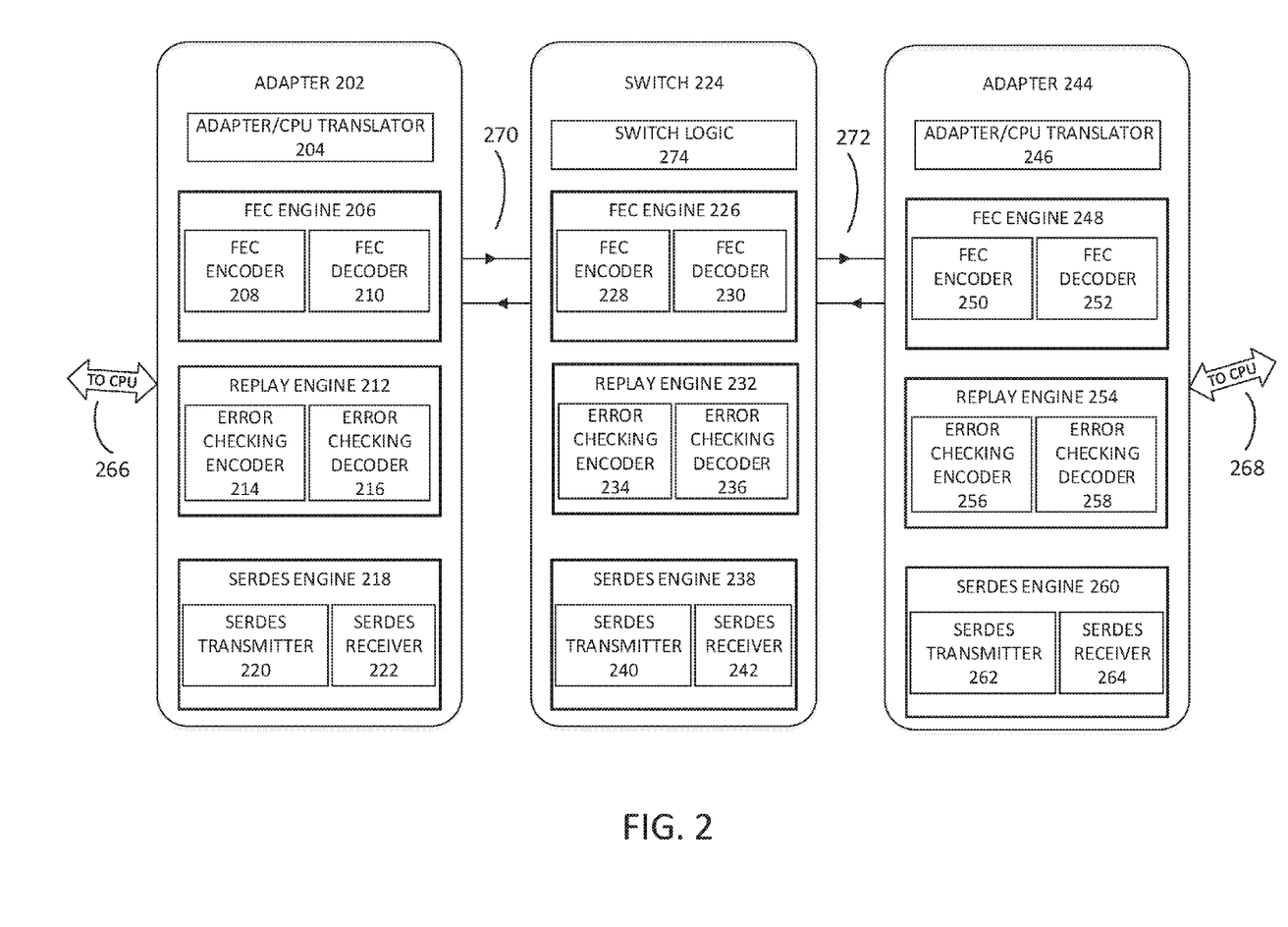
FIG. 2 is a simplified block diagram of components of an exemplary high performance computing system incorporating forward error correction and replay, in accordance with various embodiments.

FIG. 2 is a simplified block diagram of components of an exemplary high performance computing system incorporating forward error correction and replay for correcting data errors. In FIG. 2, errors at or below a threshold level are corrected using FEC, and any remaining errors are corrected using replay. As shown in FIG. 2, a high performance computing system may include one or more adapter chips 202, 244 connected via switch chip 224 or a plurality of switch chips (not shown). Adapter chip 202, 244 may include a translator 204, 246 for converting CPU instructions into network language and for converting network language into CPU instructions.

Adapter chip 202, 244 may include FEC engine 206, 248, which may include FEC encoder 208, 250 and FEC decoder 210, 252. FEC engine 206, 248 processes data for FEC correction. FEC encoder 208, 250 may encode the data to add the correction bits to the payload bits when transmitting data. FEC decoder 210, 252 may decode received data to identify data errors and correct the errors.

Adapter chip 202, 244 may include replay engine 212, 254, which may include error checking encoder 214, 256 and error checking decoder 216, 258. Error checking encoder 214, 256 encodes data to generate and append the error checking code to the data when transmitting such that the error checking decoder 216, 258 may re-encode the data, compare the received error checking code to the received error checking code, and determine whether or not an error has occurred. Replay engine 212, 254 may request that the sender retransmit data sequentially starting from the identified erroneous data.

Adapter chip 202, 244 may include a serializer/deserializer (SerDes) engine 218, 260, which may include SerDes transmitter 220, 262 and SerDes receiver 222, 264. SerDes engine 218, 260 is a pair of functional blocks commonly used in high speed data transmission to compensate for limited input/output. The SerDes blocks convert data between serial data and parallel interfaces in each direction, such that data may be transmitted over a single/differential line to minimize the number of input/output pins and interconnects. As data communication is bi-directional 270, 272 between adapter chip 202, 244 and switch chip 224, encoders/decoders and transmitters/receivers are necessary depending on whether adapter chip 202, 244 is sending or receiving data. Adapter chips 202, 244 may include connections 266, 268, which connect to an endpoint CPU, respectively.

Switch chip 224 may include switch logic 274, which passes data to the appropriate output port. Switch chip 224 may include FEC engine 226, which may include FEC encoder 228 and FEC decoder 230. As with adapter chips, FEC engine 226 processes data for FEC correction. FEC encoder 228 may encode the data to add the correction bits to the payload bits when transmitting data. FEC decoder 230 may decode received data to identify data errors and correct the errors. Switch chip 224 may include replay engine 232 which may include error checking encoder 234 and error checking decoder 236. Error checking encoder 234 encodes data when transmitting such that the error checking decoder 236 may decode the data, compare the send data to the received data, and determine whether or not an error has occurred. Switch chip 224 may include SerDes engine 238, which may include SerDes transmitter 240 and SerDes receiver 242 for serializing and deserializing data. In some embodiments, a plurality of switch chips may connect adapter chips 202, 244. In some embodiments, switch chip 224 may connect a plurality of adapter chips.

Figure 3A:
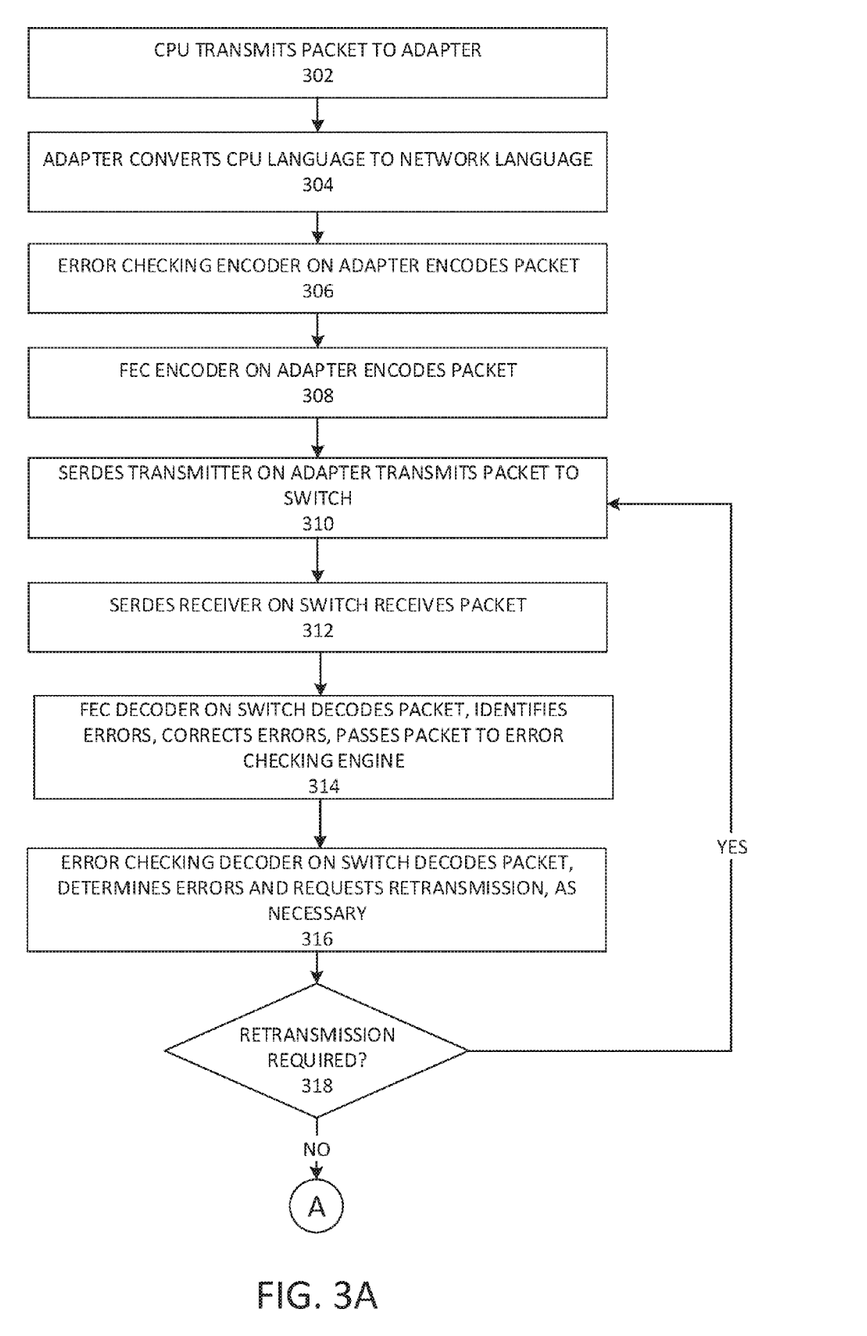
FIGS. 3A-3B are flow diagrams of an exemplary method of correcting data errors in a high performance computing system using forward error correction and replay, in accordance with various embodiments.
Figure 3B:
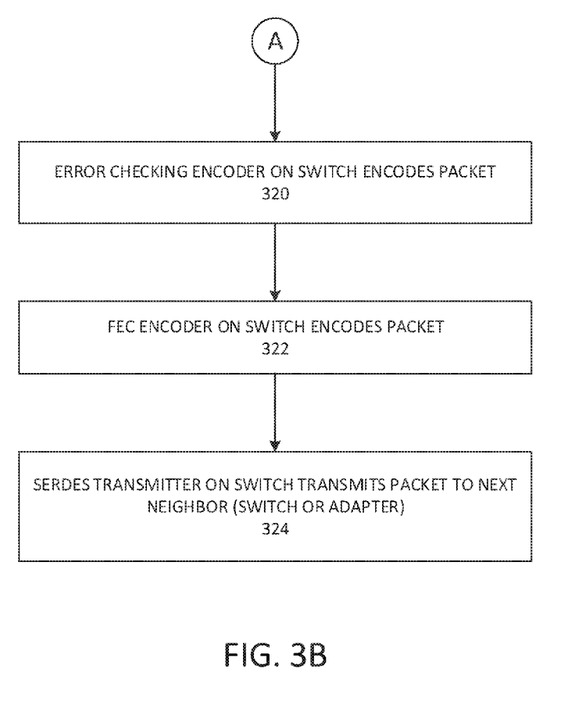

FIGS. 3A-3B are flow diagrams of an exemplary method of correcting data errors in a high performance computing system using forward error correction and replay when data is transmitted from one endpoint CPU to another endpoint CPU. At 302, CPU transmits data packet to adapter chip. At 304, adapter chip translates CPU instructions into network language. At 306, error checking encoder on replay engine on adapter chip encodes packet and adds error checking bits to payload bits. At 308, FEC encoder on FEC engine on adapter chip encodes packet and adds FEC bits to the error checking bits and the payload bits. At 310, SerDes transmitter on adapter chip transmits packet to switch chip (i.e., next neighbor chip). At 312, SerDes receiver on switch chip receives packet. At 314, FEC decoder on switch chip decodes packet, identifies and corrects errors at or below a threshold level, and then passes packet to error checking engine.

At 316, error code checker on switch chip calculates the error code on the incoming data, compares it to the received error check code, determines whether or not the data has remaining errors, and, if there are errors, requests retransmission from the sender. At 318, if switch chip requests retransmission of data from the adapter chip sender, the adapter chip may retrieve data from memory where recently sent data may be stored for retransmission. Adapter chip will treat retransmission the same as an original transmission and will repeat the transmission procedure starting at 310. When a retransmission is not requested, the packet is passed to the switch logic for processing. At 320, the error checking encoder on switch chip encodes the packet. At 322, FEC encoder on switch chip encodes packet. At 324, SerDes transmitter on switch chip transmits the packet to the next neighbor, which may be another switch chip or an adapter chip for an endpoint CPU, and the neighbor repeats the process of decoding, correcting errors and requesting retransmission, as needed, until the correct data is received by the other endpoint CPU. It will be understood by one of ordinary skill in the art that the error correction techniques as described herein for a high performance computing system may apply to other high performance systems, such as cloud-based systems, database systems, or any high speed serial bus or network systems.

Figure 4:
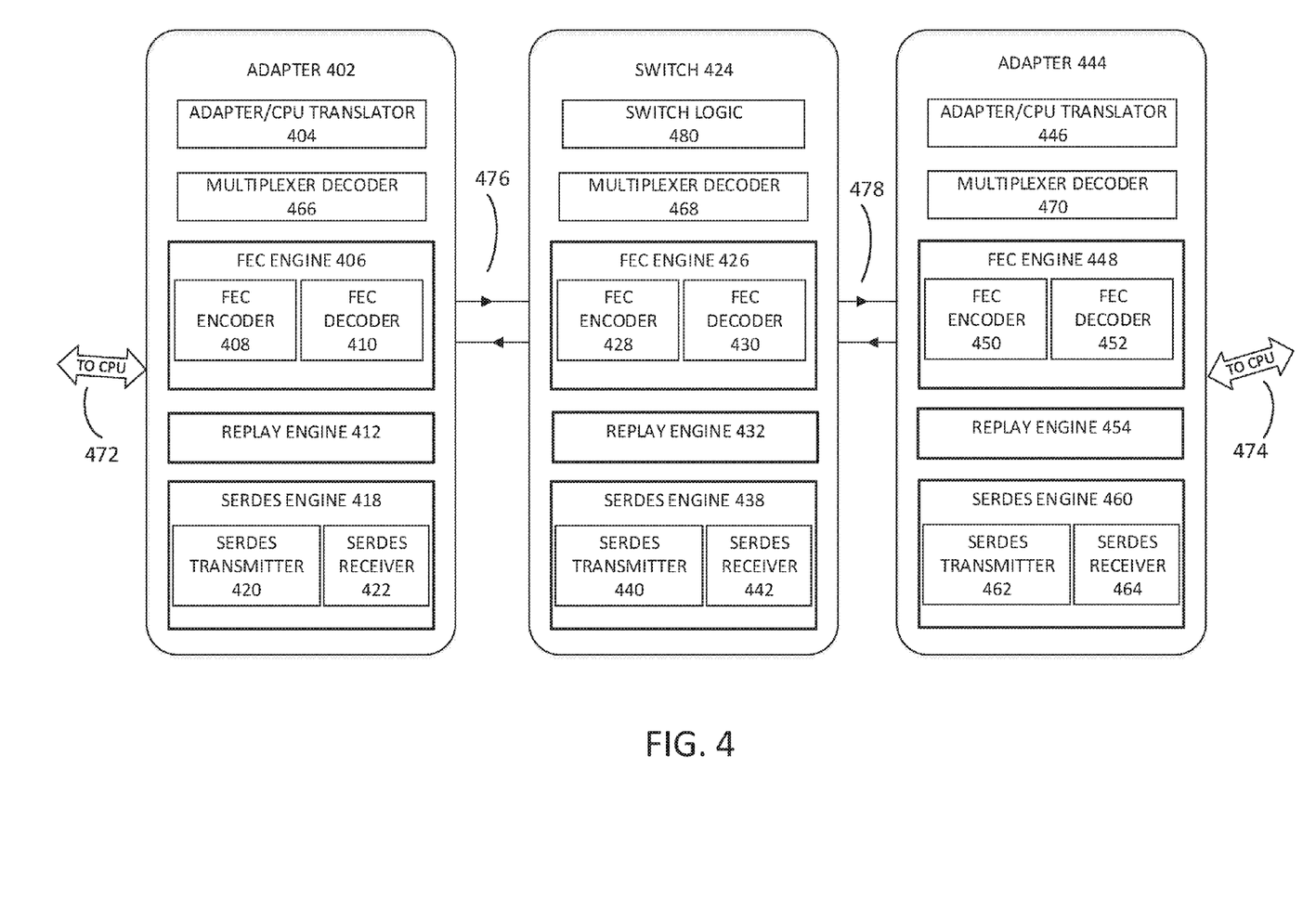
FIG. 4 is a simplified block diagram of components of an exemplary high performance computing system incorporating forward error correction and replay, in accordance with various embodiments.

FIG. 4 is a simplified block diagram of components of an exemplary high performance computing system incorporating forward error correction and replay for correcting data errors. As shown in FIG. 4, a high performance computing system may include one or more adapter chips 402, 444 connected via switch chip 424. Adapter chip 402, 444 may include a translator 404, 446 for converting CPU instructions into network language and for converting network language into CPU instructions.

Adapter chip 402, 444 may include FEC engine 406, 448, which may include FEC encoder 408, 450 and FEC decoder 410, 452. FEC engine 406, 448 processes data for FEC correction. FEC encoder 408, 450 may encode the data to add the correction bits to the payload bits when transmitting data. FEC decoder 410, 452 may decode received data to identify data errors and correct the errors at or below a threshold.

Adapter chip 402, 444 may include replay engine 412, 454. If the number of errors exceeds the threshold, replay engine 412, 454 may request that the sender retransmit data sequentially starting from the identified bit error.

Adapter chip 402, 444 may include SerDes engine 418, 460, which may include SerDes transmitter 420, 462 and SerDes receiver 422, 464 for converting data between serial and parallel interfaces in each direction. As data communication is bi-directional 476, 478 between adapter chip 402, 444 and switch chip 424, encoders/decoders and transmitters/receivers are necessary depending on whether adapter chip 402, 444 is sending or receiving data. Adapter chips 402, 444 may include connections 472, 474, which connect to an endpoint CPU, respectively.

Adapter chip 402, 444 may include multiplexer decoder 466, 470, which may determine the type of error correction, FEC or replay, for a data packet based on the number of errors. The multiplexer decoder 466, 470 may determine the number of errors in the incoming data. If the quantity of errors is at or below a threshold, data may be routed to FEC decoder 410, 452 for error correction. If the quantity of errors exceeds the threshold, a replay 412, 454 may be requested.

Switch chip 424 may include switch logic 480, which passes data to the appropriate output port. Switch chip 424 may include FEC engine 426, which may include FEC encoder 428 and FEC decoder 430. As with adapter chips, FEC engine 426 processes data for FEC correction. FEC encoder 428 may encode the data to add the correction bits to the payload bits when transmitting data. FEC decoder 430 may decode received data to identify data errors and correct the errors. Switch chip 424 may include replay engine 432. If the number of errors exceeds the threshold, replay engine 432 may request that the sender retransmit data sequentially starting from the identified bit error. Switch chip 424 may include SerDes engine 438, which may include SerDes transmitter 440 and SerDes receiver 442 for serializing and deserializing data. In some embodiments, a plurality of switch chips may connect adapter chips 402, 444. In some embodiments, switch chip 424 may connect a plurality of adapter chips.

Switch chip 424 may include multiplexer decoder 468, which may determine the type of error correction, FEC or replay, for a data packet based on the number of errors. The multiplexer decoder 468 may determine the number of errors in the incoming data. If the quantity of errors is at or below a threshold, data may be routed to FEC decoder 430 for error correction. If the quantity of errors exceeds the threshold, a replay 432 may be requested.

Figure 5A:
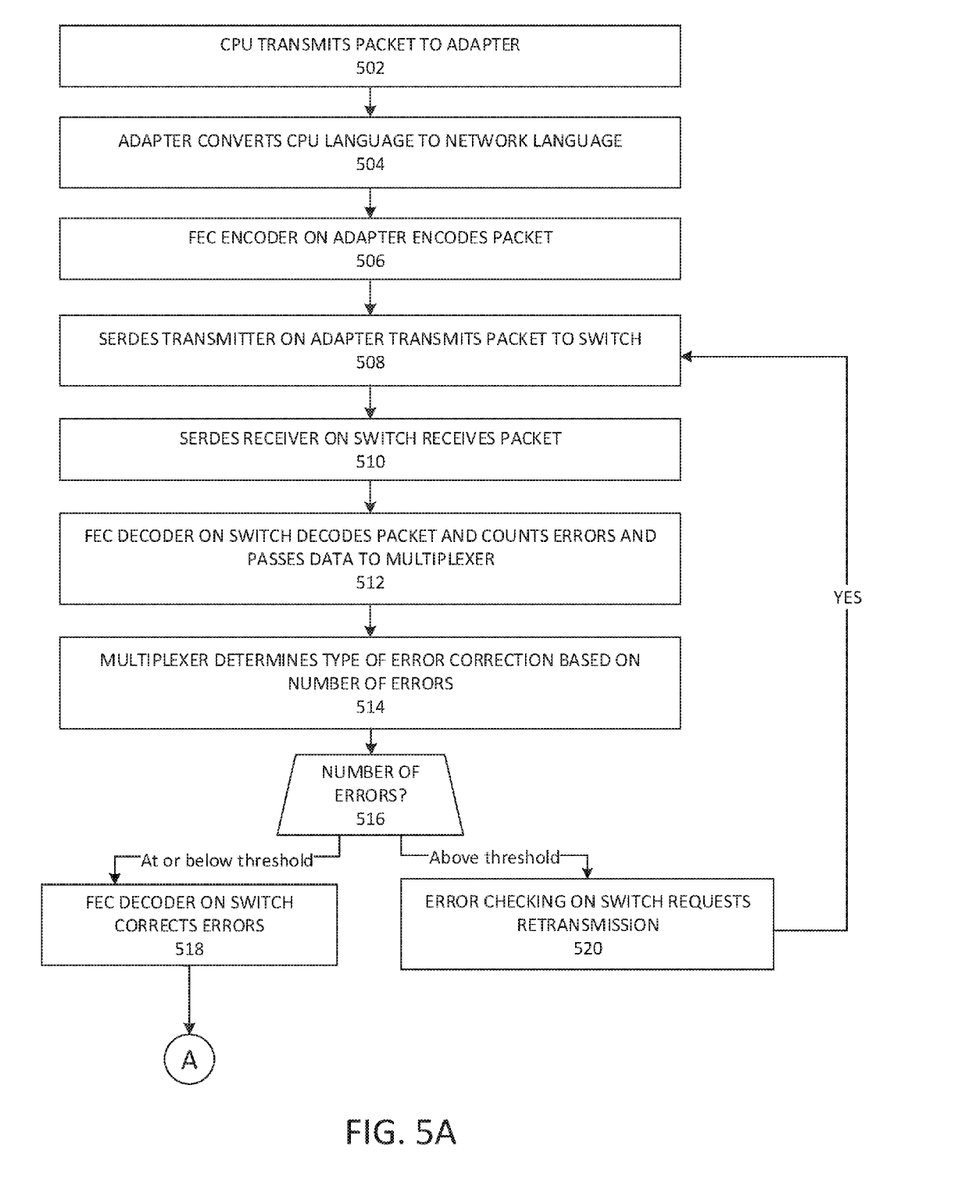
FIGS. 5A-5B are flow diagrams of an exemplary method of correcting data errors in a high performance computing system using forward error correction or replay, in accordance with various embodiments.
Figure 5B:
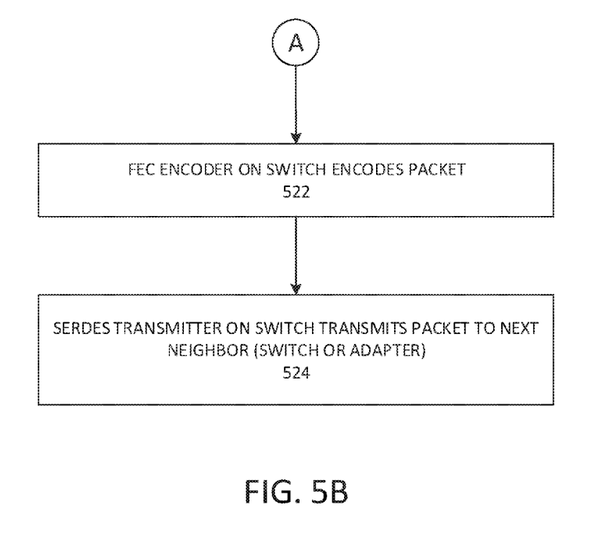

FIGS. 5A-5B are flow diagrams of another exemplary method of correcting data errors in a high performance computing system using a multiplexer to determine the type of error correction to apply, either forward error correction or replay, when data is transmitted from one endpoint CPU to another endpoint CPU. At 502, CPU transmits data packet to adapter chip. At 504, adapter chip translates CPU language into network language. At 506, FEC encoder on FEC engine on adapter chip encodes packet and adds FEC bits to the payload bits. At 508, SerDes transmitter on adapter chip transmits packet to switch chip (i.e., next neighbor chip). At 510, SerDes receiver on switch chip receives packet. At 512, FEC decoder on switch chip decodes packet and calculates the number of errors in the packet, then passes the data packet to the multiplexer. At 514, multiplexer determines the type of error correction procedure to apply based on the number of errors. At 516, if the number of errors are at or below a threshold value, FEC is applied. If the number of errors is above a threshold value, replay is applied.

At 518, if FEC is applied, FEC decoder on switch chip identifies and corrects errors. At 520, if replay is applied, replay engine on switch chip requests retransmission from the sender. When the adapter chip resends the data, the packet and sequential packets are reprocessed starting at 508. When a retransmission is not requested, the packet is passed to the switch logic for processing. At 522, FEC encoder on switch chip encodes packet. At 524, SerDes transmitter on switch chip transmits the packet to the next neighbor, which may be another switch chip or an adapter chip, and the neighbor repeats the process of decoding, correcting errors and requesting retransmission, as needed, until the correct data is received by the other endpoint CPU.

The above description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The following paragraphs provide various examples of the embodiments disclosed herein.

Example 1 is a method for data error correction at the link level in a high performance computing system, the method including: receiving a data packet; decoding the data packet using forward error correction; correcting errors in the data packet using forward error correction for a number of errors at or below a threshold value; decoding the data packet using error checking; and requesting retransmission of the data packet, if an error is detected by error checking.

Example 2 may include the subject matter of Example 1, and may further include, if no errors are detected: encoding the data packet using error checking; encoding the data packet using forward error correction; and transmitting the data packet.

Example 3 may include the subject matter of Example 1, and may further specify that the threshold value is 2.

Example 4 may include the subject matter of Example 1, and may further specify that the threshold value is 1.

Example 5 may include the subject matter of Example 1, and may further specify that the high performance system is a high performance computing system.

Example 6 may include the subject matter of Example 1, and may further specify that the high performance system is a point to point network.

Example 7 is a system for data packet error correction at the link level in a high performance computing system, the system including: two or more central processing units; two or more adapter chips, the adapter chips including: a central processing unit translator; a serializer/deserializer engine, the serializer/deserializer engine configured to transmit and receive the data packet; a forward error correction engine, the forward error correction engine configured to apply forward error correction to the data packet; and a replay engine, the replay engine configured to apply error checking to the data packet; at least one switch chip, the switch chip including: a serializer/deserializer engine, the serializer/deserializer engine configured to transmit and receive the data packet; a forward error correction engine, the forward error correction engine configured to apply forward error correction to the data packet; a replay engine, the replay engine configured to apply error checking to the data packet; and switch logic; and communication circuitry, wherein the communication circuitry connects the central processing units, the adapter chips, and the switch chip.

Example 8 may include the subject matter of Example 7, and may further specify that the forward error correction engine is configured to apply forward error correction to correct a number of errors at or below a threshold value.

Example 9 may include the subject matter of Example 7, and may further specify that at least one of the adapter chips is integrated on at least one of the central processing units.

Example 10 may include the subject matter of Examples 7-9, and may specify that the replay engine is further configured to request retransmission of the data packet if an error is detected by error checking.

Example 11. may include the subject matter of Examples 7-10, and may specify that the adapter chips and switch chip are further configured to, if no errors are detected, encode the data packet using error checking, encode the data packet using forward error correction, and transmit the data packet.

Example 12 may include the subject matter of Example 8, and may further specify that the threshold value is 2.

Example 13 may include the subject matter of Example 8, and may further specify that the threshold value is 1.

Example 14 is a method for data error correction at the link level in a high performance computing system, the method including: receiving a data packet; decoding the data packet using forward error correction; determining the number of errors in the data packet; correcting errors in the data packet using forward error correction when the number of errors is at or below a threshold value; and requesting retransmission of the data packet when the number of errors is above the threshold value.

Example 15 may include the subject matter of Example 14, and may further include: encoding the data packet using forward error correction when no errors are detected in the data packet; and transmitting the data packet.

Example 16 may include the subject matter of Example 14, and may further specify the threshold value is 2.

Example 17 may include the subject matter of Example 14, and may further specify that the threshold value is 1.

Example 18 may include the subject matter of Example 14, and may further specify that the high performance system is a high performance computing system.

Example 19 may include the subject matter of Example 14, and may further specify that the high performance system is a point to point network.

Example 20 is a system for data packet error correction at the link level in a high performance computing system, the system including: two or more central processing units; two or more adapter chips, the adapter chips including: a central processing unit translator; a serializer/deserializer engine, the serializer/deserializer engine configured to transmit and receive the data packet; a multiplexer decoder, the multiplexer decoder configured to determine the number of errors and the error correction technique to apply based on a threshold error value; a forward error correction engine, the forward error correction engine configured to apply forward error correction to the data packet; and a replay engine, the replay engine configured to request retransmission of the data packet; at least one switch chip, the switch chip including: a serializer/deserializer engine, the serializer/deserializer engine configured to transmit and receive the data packet; a multiplexer decoder, the multiplexer decoder configured to determine the number of errors and the error correction technique to apply based on a threshold error value; a forward error correction engine, the forward error correction engine configured to apply forward error correction to the data packet; a replay engine, the replay engine configured to apply error checking to the data packet; and switch logic; and communication circuitry, wherein the communication circuitry connects the central processing units, the adapter chips, and the switch chip.

Example 21 may include the subject matter of Example 20, and may further specify that the forward error correction engine is configured to apply forward error correction if the number of errors is at or below the threshold value.

Example 22 may include the subject matter of Example 20, and may further specify that the replay engine is configured to request retransmission of the data packet if the number of errors is above the threshold value.

Example 23 may include the subject matter of Example 20, and may further specify that at least one of the adapter chips is integrated on at least one of the central processing units.

Example 24 may include the subject matter of Example 21, and may further specify the threshold value is 2.

Example 25 may include the subject matter of Example 21, and may further specify that the threshold value is 1.

Example 26 is one or more machine-readable storage media including one or more instructions stored thereon that when executed by at least one processor, cause the at least one processor to: receive a data packet; decode the data packet using forward error correction; correct errors in the data packet using forward error correction for a number of errors at or below a threshold value; decode the data packet using error checking; and request retransmission of the data packet, if an error is detected by error checking.

Example 27 may include the subject matter of Example 26, and may further include one or more instructions that when executed by the at least one processor, cause the at least one processor to, if no errors are detected: encode the data packet using error checking; encode the data packet using forward error correction; and transmit the data packet.

Example 28 may include the subject matter of Examples 26-27, and may further specify that the threshold value is 2.

Example 29 is one or more machine-readable storage media including one or more instructions stored thereon that when executed by at least one processor, cause the at least one processor to: receive a data packet; decode the data packet using forward error correction; determine the number of errors in the data packet; correct errors in the data packet using forward error correction when the number of errors is at or below a threshold value; and request retransmission of the data packet when the number of errors is above the threshold value.

Example 30 may include the subject matter of Example 29, and may further include one or more instructions that when executed by the at least one processor, cause the at least one processor to, if no errors are detected: encode the data packet using forward error correction when no errors are detected in the data packet; and transmit the data packet.

Example 31 may include the subject matter of Examples 29-30, and may further specify that the threshold value is 2.

Example 32 is a system including: means for receiving a data packet; means for decoding the data packet using forward error correction; means for correcting errors in the data packet using forward error correction for a number of errors at or below a threshold value; means for decoding the data packet using error checking; and means for requesting retransmission of the data packet, if an error is detected by error checking.

Example 33 may include the subject matter of Example 32, and may further include, if no errors are detected: means for encoding the data packet using error checking; means for encoding the data packet using forward error correction; and means for transmitting the data packet.

Example 34 may include the subject matter of Examples 32-33, and may further specify that the threshold value is 2.

Example 35 is a system including: means for receiving a data packet; means for decoding the data packet using forward error correction; means for determining the number of errors in the data packet; means for correcting errors in the data packet using forward error correction when the number of errors is at or below a threshold value; and means for requesting retransmission of the data packet when the number of errors is above the threshold value.

Example 36 may include the subject matter of Example 35, and may further include, if no errors are detected: means for encoding the data packet using forward error correction when no errors are detected in the data packet; and means for transmitting the data packet.

Example 37 may include the subject matter of Examples 35-36, and may further specify that the threshold value is 2.

Example 38 is a computing device including: a processor; and a memory having plurality of instructions that when executed by the processor cause the computing device to perform the method of any of Examples 1-6.

Example 39 is a computing device including: a processor; and a memory having plurality of instructions that when executed by the processor cause the computing device to perform the method of any of Examples 14-19.

Example 40 is one or more machine-readable storage media comprising one or more instructions stored thereon that when executed by at least one processor, cause the at least one processor to perform the method of any of Examples 1-6.

Example 41 is one or more machine-readable storage media comprising one or more instructions stored thereon that when executed by at least one processor, cause the at least one processor to perform the method of any of Examples 14-19.

Example 42 is a computing device comprising means for performing the method of any of Examples 1-6.

Example 43 is a computing device comprising means for performing the method of any of Examples 14-19.

What is claimed is:

1. A system for data packet error correction at a link level in a high performance system, the system comprising:
    two or more central processing units configured to transmit and receive a data packet;
    two or more adapter chips, each adapter chip comprising:
        a central processing unit translator configured to translate the data packet received from one of the two or more central processing units;
        a serializer/deserializer engine, the serializer/deserializer engine configured to transmit and receive the data packet to and from the adapter chip;
        a forward error correction engine, the forward error correction engine configured to apply forward error correction to the data packet received by the adapter chip; and
        a replay engine, the replay engine configured to apply error checking to the data packet received by the adapter chip;
    at least one switch chip, the switch chip comprising:
        a serializer/deserializer engine, the serializer/deserializer engine configured to transmit and receive the data packet to and from the switch chip;
        a forward error correction engine, the forward error correction engine configured to apply forward error correction to the data packet received by the switch chip;
        a replay engine, the replay engine configured to apply error checking to the data packet received by the switch chip; and
        switch logic; and
    a plurality of communication links, wherein:
        a first one of the plurality of communication links connects a first one of the two or more central processing units with a first one of the two or more adapter chips, a second one of the plurality of communication links connects the first one of the two or more adapter chips with the at least one switch chip, a third one of the plurality of communication links connects the at least one switch chip with a second one of the two or more adapter chips, and a fourth one of the plurality of communication links connects the second one of the two or more adapter chips with a second one of the two or more central processing units.

2. The system of claim 1, wherein the forward error correction engine included with the switch chip is configured to apply forward error correction to correct a number of errors at or below a threshold value.

3. The system of claim 1, wherein the replay engine included with the switch chip is configured to request retransmission of the data packet received by the switch chip based on a determination that error checking detects an error.

4. The system of claim 1, wherein the switch chip is further configured to, based on a determination that no errors are detected by error checking, encode the data packet using error checking, encode the data packet using forward error correction, and transmit the data packet.

5. The system of claim 2, wherein the threshold value is 2.

6. The system of claim 2, wherein the threshold value is 1.

7. A system for data packet error correction at a link level in a high performance system, the system comprising:
two or more central processing units configured to transmit and receive a data packet;
two or more adapter chips, wherein at least one of the adapter chips is integrated on at least one of the central processing units, each adapter chip comprising:
a central processing unit translator configured to translate the data packet received from one of the two or more central processing units;
a serializer/deserializer engine, the serializer/deserializer engine configured to transmit and receive the data packet to and from the adapter chip;
a forward error correction engine, the forward error correction engine configured to apply forward error correction to the data packet received by the adapter chip; and
a replay engine, the replay engine configured to apply error checking to the data packet received by the adapter chip;
at least one switch chip, the switch chip comprising:
a serializer/deserializer engine, the serializer/deserializer engine configured to transmit and receive the data packet to and from the switch chip;
a forward error correction engine, the forward error correction engine configured to apply forward error correction to the data packet received by the switch chip;
a replay engine, the replay engine configured to apply error checking to the data packet received by the switch chip; and
switch logic; and
a plurality of communication links, wherein:
a first one of the plurality of communication links connects a first one of the two or more central processing units, integrated with a first one of the two or more adapter chips, with the at least one switch chip, a second one of the plurality of communication links connects the at least one switch chip with a second one of the two or more adapter chips, and a third one of the plurality of communication links connects the second one of the two or more adapter chips with a second one of the two or more central processing units.

8. A system for data packet error correction at a link level in a high performance system, the system comprising:
two or more central processing units configured to transmit and receive a data packet;
two or more adapter chips, each adapter chip comprising:
a central processing unit translator configured to translate the data packet received from one of the two or more central processing units;
a serializer/deserializer engine, the serializer/deserializer engine configured to transmit and receive the data packet to and from the adapter chip;
a multiplexer decoder, the multiplexer decoder configured to determine a number of errors in the data packet received by the adapter chip and a first error correction technique to apply based on a threshold error value;
a forward error correction engine, the forward error correction engine configured to apply forward error correction to the data packet received by the adapter chip; and
a replay engine, the replay engine configured to request retransmission of the data packet received by the adapter chip;
at least one switch chip, the switch chip comprising:
a serializer/deserializer engine, the serializer/deserializer engine configured to transmit and receive the data packet;
a multiplexer decoder, the multiplexer decoder configured to determine a number of errors in the data packet received by the switch chip and a second error correction technique to apply based on the threshold error value;
a forward error correction engine, the forward error correction engine configured to apply forward error correction to the data packet received by the switch chip;
a replay engine, the replay engine configured to apply error checking to the data packet received by the switch chip; and
switch logic; and
a plurality of communication links, wherein:
a first one of the plurality of communication links connects a first one of the two or more central processing units with a first one of the two or more adapter chips, a second one of the plurality of communication links connects the first one of the two or more adapter chips with the at least one switch chip, a third one of the plurality of communication links connects the at least one switch chip with a second one of the two or more adapter chips, and a fourth one of the plurality of communication links connects the second one of the two or more adapter chips with a second one of the two or more central processing units.

9. The system of claim 8, wherein the forward error correction engine included with the switch chip is configured to apply forward error correction based on a determination that the number of errors in the data packet received by the switch chip is at or below the threshold error value.

10. The system of claim 8, wherein the replay engine included with the switch chip is configured to request retransmission of the data packet based on a determination that the number of errors in the data packet received by the switch chip is above the threshold error value.

11. The system of claim 9, wherein the threshold error value is 2.

12. The system of claim 9, wherein the threshold error value is 1.

13. A system for data packet error correction at a link level in a high performance system, the system comprising:
two or more central processing units configured to transmit and receive a data packet;
two or more adapter chips, wherein at least one of the adapter chips is integrated on at least one of the central processing units, each adapter chip comprising:
a central processing unit translator configured to translate the data packet received from one of the two or more central processing units;
a serializer/deserializer engine, the serializer/deserializer engine configured to transmit and receive the data packet to and from the adapter chip;
a multiplexer decoder, the multiplexer decoder configured to determine a number of errors in the data packet received by the adapter chip and a first error correction technique to apply based on a threshold error value;

a forward error correction engine, the forward error correction engine configured to apply forward error correction to the data packet received by the adapter chip; and a replay engine, the replay engine configured to request retransmission of the data packet received by the adapter chip;

at least one switch chip, the switch chip comprising:

a serializer/deserializer engine, the serializer/deserializer engine configured to transmit and receive the data packet to and from the switch chip;

a multiplexer decoder, the multiplexer decoder configured to determine a number of errors in the data packet received by the switch chip and a second error correction technique to apply based on the threshold error value;

a forward error correction engine, the forward error correction engine configured to apply forward error correction to the data packet received by the switch chip;

a replay engine, the replay engine configured to apply error checking to the data packet received by the switch chip; and switch logic; and a plurality of communication links, wherein:

a first one of the plurality of communication links connects a first one of the two or more central processing units, integrated with a first one of the two or more adapter chips, with the at least one switch chip, a second one of the plurality of communication links connects the at least one switch chip with a second one of the two or more adapter chips, and a third one of the plurality of communication links connects the second one of the two or more adapter chips with a second one of the two or more central processing units.

* * * * *